(12) United States Patent
Scaff

(10) Patent No.: US 8,537,402 B2
(45) Date of Patent: *Sep. 17, 2013

(54) APPARATUS AND METHOD FOR METERING AND MONITORING PRINT USAGE AT NON-NETWORK PRINTERS

(75) Inventor: Marvin Scaff, Tampa, FL (US)

(73) Assignee: Emerge Print Management, LLC, Tampa, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/549,894

(22) Filed: Jul. 16, 2012

(65) Prior Publication Data

US 2013/0021648 A1 Jan. 24, 2013

Related U.S. Application Data

(63) Continuation of application No. 11/812,018, filed on Jun. 14, 2007, now Pat. No. 8,223,365.

(51) Int. Cl.
*G06F 3/12* (2006.01)
*G06F 15/16* (2006.01)
*G06K 15/00* (2006.01)

(52) U.S. Cl.
USPC ........ 358/1.15; 358/1.13; 358/1.14; 709/201; 709/223

(58) Field of Classification Search
None
See application file for complete search history.

(56) References Cited

U.S. PATENT DOCUMENTS

| | | | |
|---|---|---|---|
| 8,223,365 B2 * | 7/2012 | Scaff | 358/1.15 |
| 2004/0190042 A1 * | 9/2004 | Ferlitsch et al. | 358/1.15 |
| 2009/0147299 A1 * | 6/2009 | Tetu | 358/1.15 |

* cited by examiner

*Primary Examiner* — Satwant Singh
(74) *Attorney, Agent, or Firm* — Gray Robinson, P.A.

(57) ABSTRACT

The invention relates to a printer component for monitoring usage on non-network printers. The printer component includes a desktop component installed on a network computer to which a non-network printer is attached. The desktop component is for obtaining printer status information from each non-network printer attached to the network computer. The printer component also includes a server component installed on an external server. A job listener is attached to the network computer to obtain printer status information for each non-network printer. The server component mergers information obtained from the desktop component with previously stored printer information to provide printer status information for all network and non-network printers within an enterprise.

20 Claims, 3 Drawing Sheets

APPARATUS AND METHOD FOR METERING AND MONITORING PRINT USAGE AT NON-NETWORK PRINTERS

CROSS-REFERENCE TO RELATED INVENTIONS

This application is a continuation application of pending application Ser. No. 11/812,018 filed Jun. 14, 2007, the disclosure of which is incorporated by reference herein.

BACKGROUND OF THE INVENTION

1. Field of the Invention

This invention relates to an apparatus and method for metering and monitoring print usages at non-network printers within an enterprise and for reporting information obtained into a system for consolidating and responding to real-time enterprise printing information.

2. Description of the Background Art

Presently, computer networks in an enterprise/organization typically include computer systems and peripherals, such as printers, connected to the computer systems. Organizations rely on printers for carrying out daily operations. An inoperative printer, due to failure or to the lack of components such as toner, can disrupt operations, and waste time and resources. Thus, organizations often desire to determine the extent of usage of a printer to prevent disruptions.

Computer networks typically include network printers that are connected directly to the computer network, such that the network printers may be shared by multiple users. Computer networks may also include multiple non-network printers that are connected to one or more individual computers, such that the non-network printers are used by only the computers to which it is connected. Due to the fact that non-network printers are not directly accessible via the computer network, contemporary methods of usage monitoring over the network are not applicable.

Usage of a printer is typically determined by the page count. Pages can be counted manually by sending service personnel to each printing device to procure the page counts via typical means, such as executing a printer test page. This procedure requires a considerable amount of manpower and is costly. Additionally, this procedure can be inaccurate due to human errors. One contemporary attempt to provide more accuracy in monitoring printer usage employs the counting of power surges at the printer to determine the number of pages printed. This method requires that every printer utilizes a stepper motor to advance sheets of paper during printing. Pulsing of each of the coils of the stepper motor results in pulses in the supply current which is to be detected by a separate detection circuit. The detection circuit is operably connected to both a power supply of the printer and a data collection unit. This method suffers from the drawback of being limited to particular types of printers, as well as, inaccuracies in attempting to detect power surges caused only by the coils of the stepper motor during printing. This method suffers from further drawback of requiring costly hardware for every printer in order to detect the power surges and transmit data representative of the power surges for calculation of the printer usage.

Additionally, contemporary systems that rely on only print counts, do not account for fluctuations in the use of consumable components, such as ink or toner. Usage of consumable components is typically dependent on the type of print job that has occurred. In environments that perform large print jobs, the necessity to re-print the job because of an inadequate amount of ink resulting in a poor quality of the print job, can be time consuming and costly. It is undesirable to replace consumable components during busy print times, especially where particular print jobs are time sensitive. Attempting to estimate consumption of consumable components based upon printer usage is usually inaccurate for the reasons described above. Additionally, over-estimates of usage of the consumable component is costly. Moreover, supplies for such consumable components can take time to procure resulting in further disruptions.

In order to accurately service all of the printers within the enterprise, there is a need to accurately determine the usage of both network and non-network printers. There are currently monitoring systems for monitoring the usage of network printers. However, these systems typically cannot discover non-network printers. While there are also monitoring systems that monitor the usage of non-network printers, these systems have been unable to accurately count prints and monitor printer usage on computers that are attached to two or more non-network printers. For example, if a computer system is attached to non-network printers and the computer executes a print command for multiple duplicate print batches, for example, five copies of a five page document, these systems typically count the number of copies printed for that print command as five pages instead of twenty five pages. These systems also cannot monitor ink usage for non-network printers effectively. Therefore, these systems do not accurately report when ink cartridges need to be changed and/or the amount of ink remaining in a currently used ink cartridge.

What is needed, therefore, is a process of collecting accurate data on printer usage of both network and non-network printers within an enterprise in order to accurately predict inventory requirements and to maintain peak performance on all printers within the enterprise.

Therefore, it is an object of this invention to provide an improvement which overcomes the aforementioned inadequacies of the prior art devices and provides an improvement which is a significant contribution to the advancement of the metering and monitoring print usages at non-network printers art.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, the invention relates to a printer component for monitoring usage on non-network printers. The printer component includes a desktop component installed on a network computer to which a non-network printer is attached. The desktop component is for obtaining printer status information from each non-network printer attached to the network computer. The printer component also includes a server component installed on an external server. The server component is configured to patrol the computer network to identify each desktop component and to request printer status information for each non-network printer. During installation of the desktop component, a job listener is attached to the network computer to obtain printer status information for each non-network printer. When printer status information is obtained from the desktop component, a socket server is started to listen to a port and return non-network printer objects. The server component mergers information obtained from the desktop component with previously stored printer information to provide printer status information for all network and non-network printers within an enterprise.

Another embodiment of the invention is directed to a method for monitoring usage on non-network printers. The method includes attaching a job listener to a desktop component installed on a network computer to obtain printer status information for each non-network printer. The method also includes obtaining printer status information from the desktop component installed on the network computer to which a non-network printer is attached, by starting a socket server to listen to a port and return non-network printer objects, the printer status information being for each non-network printer attached to the network computer. The method also includes patrolling, by a server component installed on an external server, the computer network to identify each desktop component and to request printer status information for each non-network printer. The method further includes merging, by the server component, information obtained from the desktop component with previously stored printer information to provide printer status information for all network and non-network printers within an enterprise.

Another embodiment of the invention is directed to a computer program product embodied on a computer readable medium, the computer program product being configured to execute a method for monitoring usage on non-network printers. The method includes attaching a job listener to a desktop component installed on a network computer to obtain printer status information for each non-network printer. The method also includes obtaining printer status information from the desktop component installed on the network computer to which a non-network printer is attached, by starting a socket server to listen to a port and return non-network printer objects, the printer status information being for each non-network printer attached to the network computer. The method also includes patrolling, by a server component installed on an external server, the computer network to identify each desktop component and to request printer status information for each non-network printer. The method further includes merging, by the server component, information obtained from the desktop component with previously stored printer information to provide printer status information for all network and non-network printers within an enterprise.

Another embodiment of the invention is directed to an apparatus for monitoring usage on non-network printers. The apparatus includes attaching means for attaching a job listener to a desktop component installed on a network computer to obtain printer status information for each non-network printer. The apparatus also includes obtaining means for obtaining printer status information from the desktop component installed on the network computer to which a non-network printer is attached, by starting a socket server to listen to a port and return non-network printer objects, the printer status information being for each non-network printer attached to the network computer. The apparatus also includes patrolling means for patrolling, by a server component installed on an external server, the computer network to identify each desktop component and to request printer status information for each non-network printer. The apparatus further includes merging means for merging, by the server component, information obtained from the desktop component with previously stored printer information to provide printer status information for all network and non-network printers within an enterprise.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Reference will now be made to the preferred embodiments of the present invention, examples of which are illustrated in the accompanying drawings.

Figure 1:
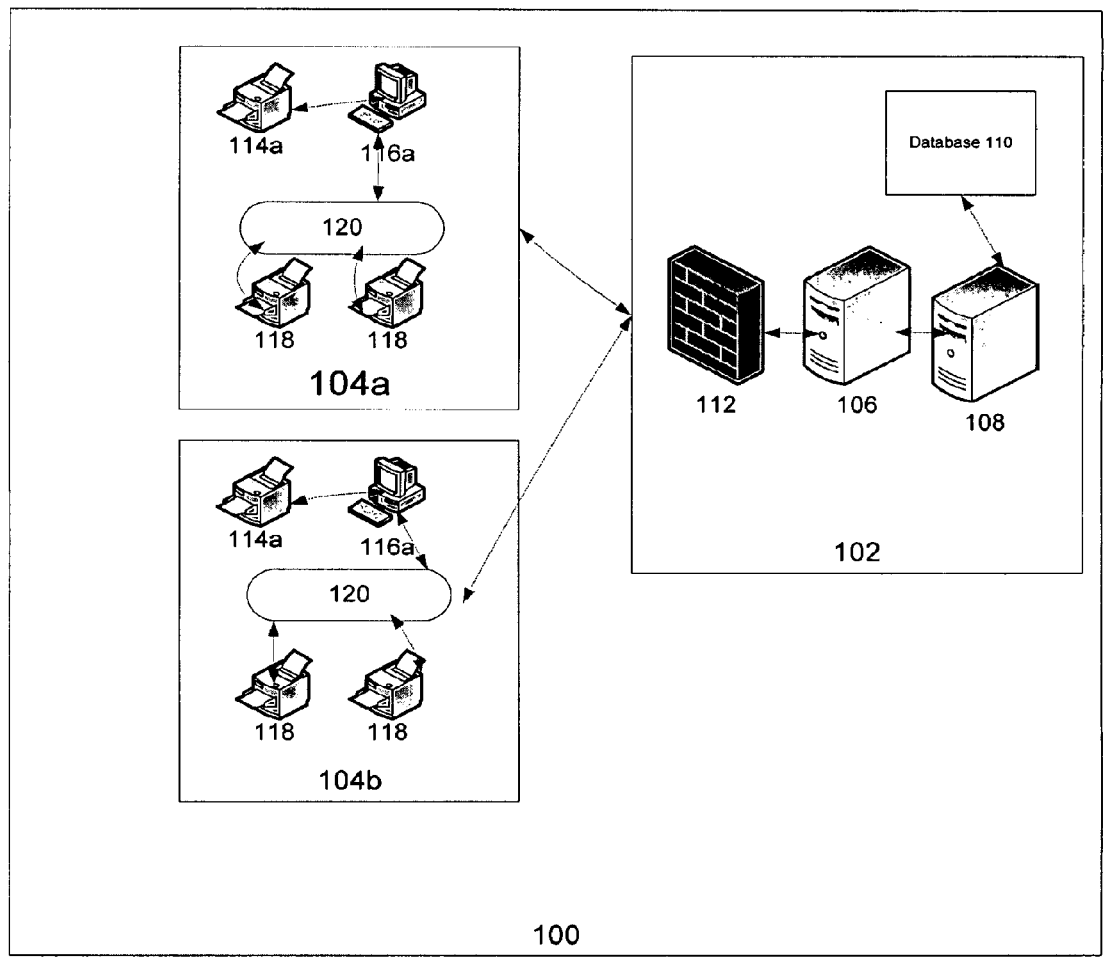
FIG. 1 illustrates an embodiment of a print management system in which embodiments of the present invention may be implemented.

FIG. 1 illustrates an embodiment of a print management system in which embodiments of the present invention may be implemented. System 100 includes a data processing system 102 in communication with one or more clients 104. It should be noted that although FIG. 1 illustrates two clients 104a and 104b, system 100 may be configured to include any number of clients 104. Data processing system 102 may include a web server 106, an application server 108, a database 110 and a firewall 112. Data communicated from clients 104 to data processing system 102 passes through firewall 112 via web server 110. Processing and storage of data into data base 110 is provided by application server 108. Database 110 can be any conventional data storage system or methodology that can store and reproduce data for use by application server 108 or other processing systems that are capable of manipulation or communication of data. Each of clients 104 includes one or more non-network printers 114 that are coupled to computers 116. Client 104 also includes one or more network printers 118 that are coupled via network 120. Thus, FIG. 1 illustrates non-network printer 114 connected to a desktop computer 116 and two network printers 118; however, it should be understood that the particular configuration of network and non-network printers, computers and other devices, as well as the configuration of the network itself, can vary, while still being within the scope of the present disclosure.

The method of communication between data processing system 102 and each of clients 104 can vary, such as, for example, over the Internet. In one embodiment, the method of communication between data processing system 102 and clients 104 can be over the World Wide Web (WWW) via Hypertext Transfer Protocol (HTTP). In an embodiment of printing management system 100, a Uniform Resource Identifier (URI) scheme is utilized for the communication between data processing system 102 and clients 104. The URI scheme provides encryption and/or authentication requirements for the transfer of data. HTTPS may be utilized for communication between data processing system 102 and clients 102 so that an additional encryption/authentication layer is utilized between HTTP and the Transmission Control Protocol (TCP). However, the present disclosure contemplates the use of other schemes, methods and devices for retrieving or delivering data and otherwise communicating between data processing system 102 and clients 104, including wireless communication and hard wired communications.

Figure 2:
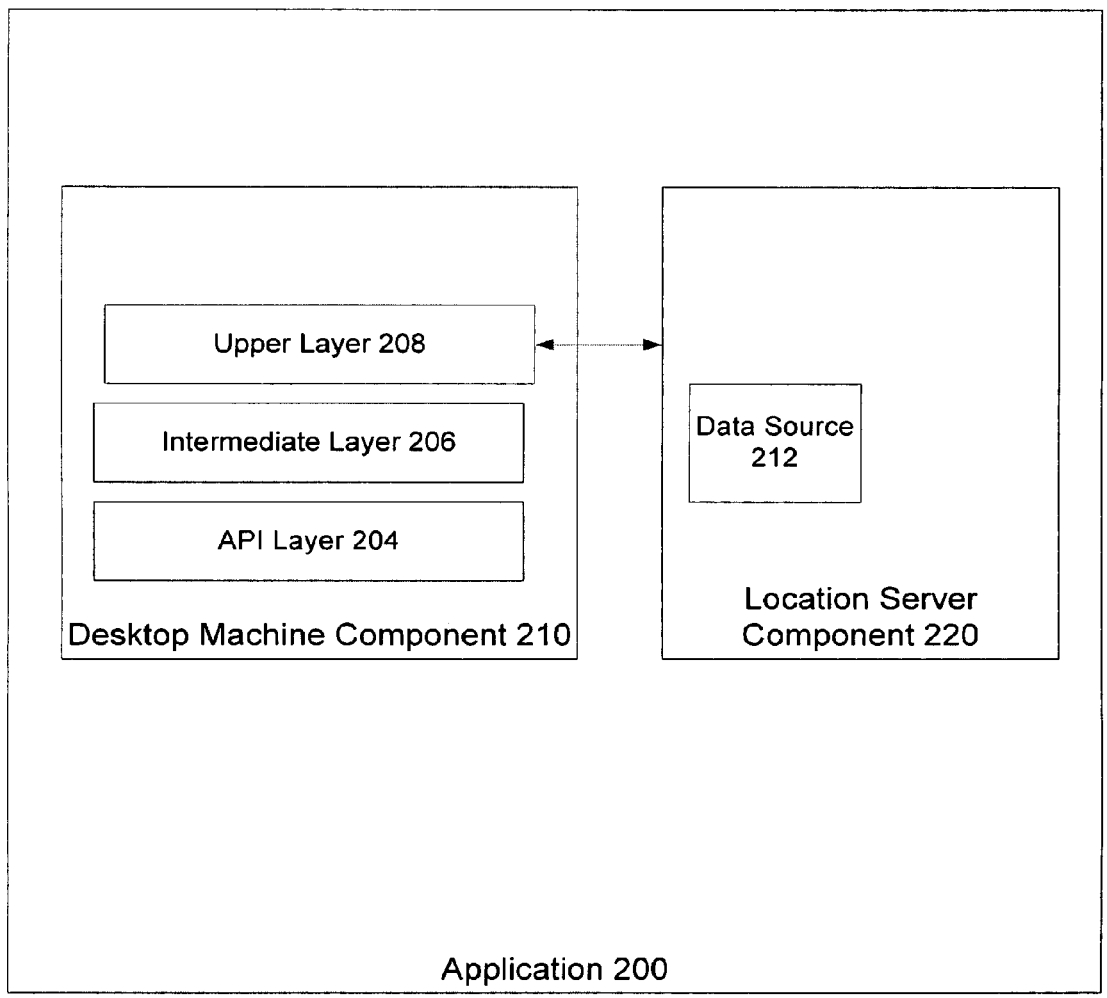
FIG. 2 illustrates an embodiment of a non-shared desktop printer (NSDP) local application which is installed on each of computers 116 that is connected to at least one non-network printer.

FIG. 2 illustrates an embodiment of a non-shared desktop printer (NSDP) local agent application. NSDP local agent 200 enables a printer service provider to meter and monitor non-network printers so that the printer service provider can consolidate printer information across an entire enterprise. NSDP local agent 200 includes a desktop machine component 210, which is installed on each computer 116 that is connected to at least one non-network printer 114, and a location server component 220, which is installed on an external location server 300. Desktop machine component 210 obtains printer status information from each non-network printer connected to a computer 116 on which desktop machine component 210 is installed. Location server component 220 patrols the computer network after a specific time interval to locate desktop machine component 210. When location server component 220 identifies desktop machine component 210, location server component 220 requests specific information from desktop machine component 210. Desktop machine component 210 provides the required information which location server component 220 may convert to XML and location server component 220 merges the converted information with previously stored printer information.

Desktop machine component 210 includes an application programming interface (API) 204, an intermediate layer 206 and an upper layer 208. API 204 may be any source code interface which supports requests for services and provides numerous structures for returning information about computer 116 and the peripherals, such as non-network printers 114, attached to computer 116. For example, these structures may be used to obtain information on the non-network printers 114 status, condition and service. Specifically, in an embodiment of the invention, API 204 obtains a list of all non-network printers 114, attaches an observer to each non-network printer 114, creates a status and page count file for each non-network printer 114, where the page count file is updated when a page is printed by non-network printer 114. In an embodiment of the invention, API 204 is implemented in a programming language, such as C++, and it is bundled as an EXE file. API layer 204 is attached to intermediate layer 206 which is further attached to upper layer 208.

In an embodiment of the invention, a Windows API layer 204, such as Win32 API, is used at the API layer 204. Win32 API layer 204 can be developed in Visual C++ or other programming languages. Win32 API layer 204 extracts data related to the non-network printers 114. In the exemplary embodiment, a dynamic-link library (DLL) file is the deliverable of Win32 API layer 204.

Intermediate layer 206 of desktop machine component 210 may be a Java Native Interface (JNI) that allows Java code running in a Java virtual machine to call and be called by native applications. JNI Layer 206 can receive data from Win32 API layer 204 and populate the Java object with the data.

Upper layer or Remote Method Invocation (RMI) Layer 208 is implemented in a programming language, such as Java. RMI layer 208 reads the information from files created by API layer 204, transforms the information to a Java object, and sends the Java objects to location server component 220. When NSDP local agent 200 runs a service, a process in RMI layer 208 runs a RMI service and registers the RMI service in a RMI registry with a specific name. This service exposes a method which returns the Java objects including information about the attached NSDP printers 114 to the location server component 220. In an embodiment of the invention, RMI service 208 exposes a single method. This service 208 receives NSDP data from the respective machines 116 in the form of Java objects. The RMI service is thread safe.

As noted above, location server component 220 patrols the computer network after a specific time interval to locate non-network printers 114. Location server component 220 is a Java RMI client. Location server component 220 looks up the RMI service 208, in the RMI registry with specified name, within a provided IP range for each IP address. If location server component 220 finds a response from desktop machine component 210 at an IP address, it retrieves the required non-network printer information and stores the retrieved information in an XML file which is later uploaded to an external print counts server.

Location server component 220 includes an XML data source 212 which fetches data from Java object and writes the data to the XML file. XML data source 212 may include an XML parser which fetches data from a Java object and writes the data to a XML file. The XML parser can read an XML document, identify all the XML tags and upload the data to the data processing system 100. As described above, data processing system 100 includes application server 108 and database 110 that provides for storage, and allows for manipulation, of all relevant data for the clients 104. Based upon this data, the clients 104 are made aware of printer usage and consumable resource or component usage. The data can be used for other purposes and manipulated accordingly, such as utilizing the data for work flow efficiency analysis within the organization.

An embodiment of the present invention includes an NSDP Version Updater which includes a NSDP Version Update Server (VUS) and NSDP Version Update Client (VUC). When configured with default parameters the NSDP Version Updater runs as a backend process. A NSDP configuration file includes information for a HTTP server running the NSDP version service. NSDP Version Updater looks for an update at the HTTP server after a configurable interval of time. If it finds an update, NSDP Version Updater downloads a patch.

The VUS uses Java servelet as version update server. The latest version information is kept in an XML file that includes major version information, minor version information, a name of a patch file, the size of the patch file and the destination of the patch file. NSDP VUC is a Swing based desktop application equipped with a built in HTTP client. It has an XML file which includes a current major version, a current minor version, and a configuration file including an address or URL of the version update server, the frequency of a version update check and an application ID and password.

After a specified interval of time, VUC requests a version check from the VUS servelet. This check is implemented as a HTTPS request which includes the current version information and the application identifier and password. The VUS authenticates the call and compares the version with available version. If the available version is later than the current version, VUS responds with a patch including a size and version information. VUC triggers a graphical user interface based on this request. The swing-based graphical user interface shows details of available version and requests that a user accepts the patch. After acceptance is confirmed, the VUC downloads, unzips and installs the patch. Then the VUC starts the NSDP service on underlying machine 210. In an embodiment of the invention, the VUC is configurable to withdraw user intervention. In that case patch is automatically downloaded and installed.

The NSDP agent 200 is, therefore, software which includes a combination of a Microsoft Windows Dynamic Linked Library (DLL) written in C++ and a socket based Java client written in the Java programming language. The Java program interacts with the Win32 API using the Java Native Interface (JNI) mechanism. The Win32 API is used to communicate with the Microsoft Windows registry to obtain information about locally attached printers 114.

As is known to those skilled in the art, not all printer models provide meter reads or page count. For these models, NSDP agent 200 invokes a job listener that places a status file locally on each computer 116 for every non-network printer 114. The status file includes a page count number for each page printed, after the installation of NSDP agent 200. When NSDP agent 200 is installed, the initial value of the page count number is zero. However, the value of the page count number it is incremented each time a page is printed on a non-network printer 114.

Non-network printers 114 provide a means to obtain an updated status on each print job. Thus, the job listener also updates the toner status in the status file. A Patrol application continuously polls NSDP agents 200 to obtain the toner status. Whenever a low toner is detected, the Patrol application sends a notification to an alerts database. NSDP agent 200 can handle multiple non-network printers 114 attached to a single workstation 116. Each non-network printer is uniquely identified by a combination of the MAC address associated with the printer, the make and the model.

Figure 3:
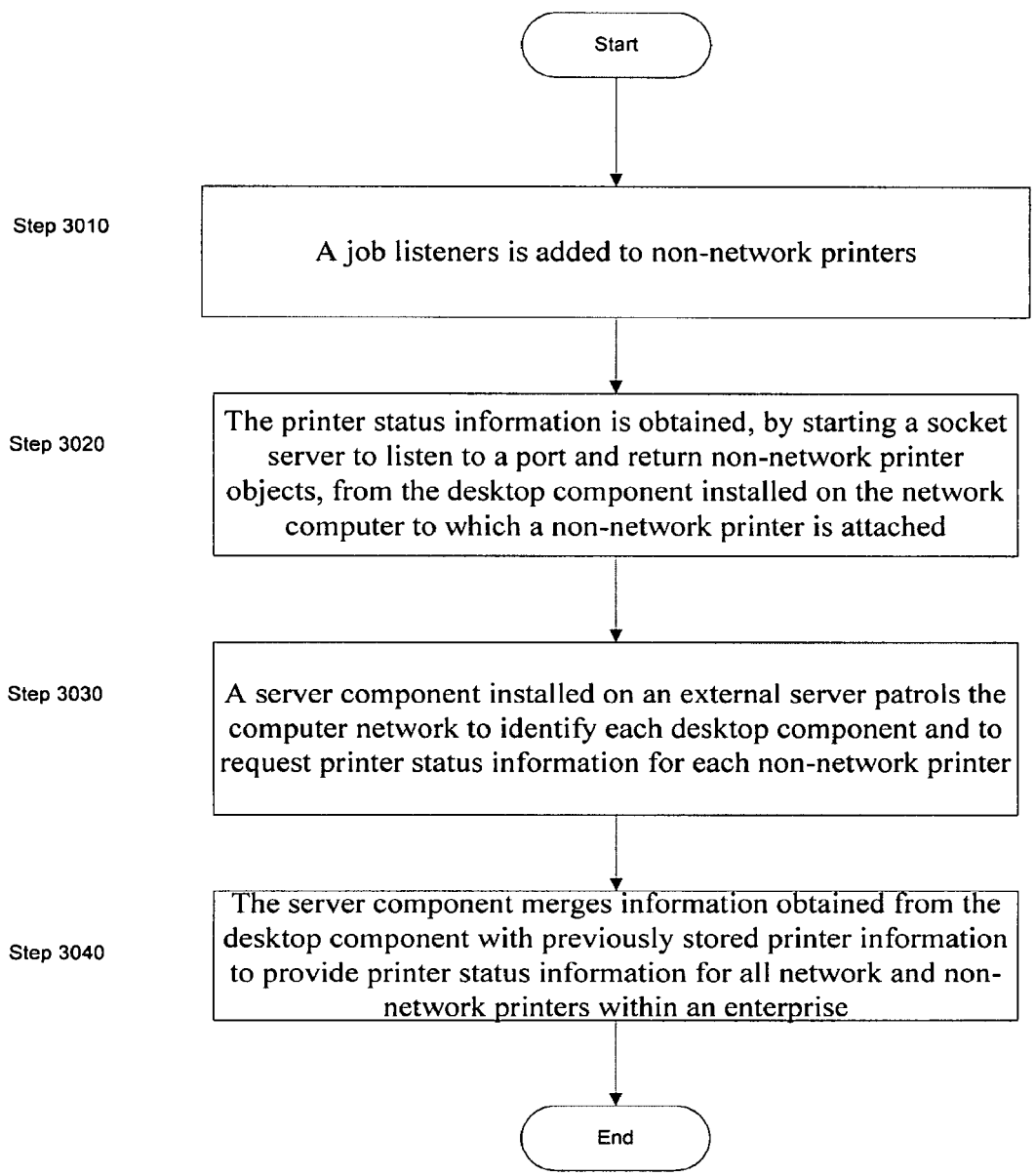
FIG. 3 illustrates the steps implemented which the NSDP agent is executed.

FIG. 3 illustrates the steps implemented which the NSDP agent is executed. In step 3010, a job listeners is added to non-network printers. Specifically, an appropriate instance is created and an add listener method is invoked. Native add printer listener methods are also invoked. All the non-network printers attached to a machine are discovered. A thread is associated with each printer and executed so that the thread listens to the job queue and printer status and every change is the printer status is noted in a filed associated with the printer. In Step 3020, the printer status information is obtained from the desktop component installed on the network computer to which a non-network printer is attached. The printer status information is for each non-network printer attached to the network computer by starting a socket server to listen to a port and return non-network printer objects. Specifically, a server socket is created at port 2006 and an appropriate instance is created. A discover method is called to locate all NSDP agents. The discover method gathers the name, model, type, status, life meter and hardware identifier for each printer. If information is not available from a printer information object of Win32 API 204, the page count is retrieved from listener file. The printer status is also obtained from listener file. In Step 3030, a server component installed on an external server patrols the computer network to identify each desktop component and to request printer status information for each non-network printer. In Step 3040, the server component merges information obtained from the desktop component with previously stored printer information to provide printer status information for all network and non-network printers within an enterprise.

In an exemplary embodiment, at pre-determined time intervals, a daemon or the like can be used to invoke RMI client layer 208 to communicate data from the client 104 to the external location server. A property file may be used for storing characteristics pertaining to the external location server to facilitate and/or enable communication with the external location server. During a first time period, after NSDP local agent application 200 confirms that the external location server is operating, NSDP local agent application 200 sends data to the external location server. If, at the first predetermined time, NSDP local agent application 200 determines that the external location server 400 is not operating then application 200 communicates the data at another predetermined time. It should be noted that the time intervals at which the daemon invokes RMI client layer 208 to communicate data to the external location server may vary to control the flow of data. The ability to vary the time interval is advantageous where the printing system or its workload has changed, such as if the client 104 has increased the number of printers or there has been a large increase in the number of print jobs being performed by one or more of the printers. In such instances, it can be advantageous to change the time interval to better control the flow of data and allow for timely calculations of printer and/or resource usage. The present disclosure also contemplates data communication between the RMI client layer 208 and the location server being in real-time, on demand, and a combination of two or more of real-time, pre-determined time intervals and on-demand communication.

Based upon printing management system 100 and the process implemented therein, the clients 104 can have their printing needs managed and maintained with minimal or no interruption in printing operation. Clients 104 can be advised of the need for service and/or resource replacement based upon the data that is being tracked for the entire printing operation, including the non-network and network printers. The data collected and stored can be further manipulated by the data processing system 100 to provide for usage warnings, service scheduling, operation improvement and the like.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus configured to carry out the methods described herein is suited. A typical combination of hardware and software may be a general purpose computer system with a computer program that, when loaded and executed, controls the computer system such that it carries out the methods described herein.

It should be appreciated by one skilled in art, that the present invention may be utilized in any computer network configuration where there are non-network and network printers, as described above. The foregoing description has been directed to specific embodiments of this invention. It will be apparent; however, that other variations and modifications may be made to the described embodiments, with the attainment of some or all of their advantages. Therefore, it is the object of the appended claims to cover all such variations and modifications as come within the true spirit and scope of the invention.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A printer component for monitoring usage on non-network printers, comprising:
   a desktop component installed on a network computer to which a plurality of non-network printers are attached, the desktop component comprising a listener, the listener configured to monitor a plurality of queues wherein each queue is associated with a non-network printer and changes to each non-network printer are noted in the respective queue; and
   a server component installed on an external server;
   wherein, at pre-determined time intervals, the desktop component communicates data to the server component,
   wherein the server component merges data obtained from the desktop component with previously stored data to provide printer status information for all network and non-network printers within an enterprise.

2. The printer component of claim 1, the desktop component further comprising:
   an application layer interface which supports requests for services and provides numerous structures for returning information about the network computer and the peripherals attached to the network computer;
   an intermediate layer configured to connect the application layer interface with an upper layer; and
   the upper layer configured to read files created by the application layer interface, to transform information from the file into objects and to send the objects to the server component.

3. The printer component of claim 2, wherein the structures may be used to obtain information on the non-network printer status, condition and service.

4. The printer component of claim 2, wherein the application layer interface is configured to attach an observer to each non-network printer and to create a status and page count file for each non-network printer, wherein the page count file is updated when a page is printed by the non-network printer.

5. The printer component of claim 2, wherein the upper layer is configured to run a service and register the service in a registry with a specific name.

6. The printer component of claim 5, wherein the server component is configured to look up the service in the register within a provided IP range for each IP address.

7. The printer component of claim 1, wherein the server component includes a data source which fetches data from an object and writes the data to a file.

8. The printer component of claim 7, wherein the data source is an XML data source which comprises an XML parser for fetching data from an object and writing the data to an XML file.

9. The printer component of claim 1, further comprising a version updater which comprises an update server and an update client.

10. The printer component of claim 2, wherein the application layer interface is configured to attach an observer to each non-network printer to obtain toner status.

11. A method for monitoring usage on non-network printers, comprising:
   attaching a job listener to a desktop component installed on a network computer to obtain printer status information for each non-network printer by listening to a job queue;
   obtaining printer status information from the desktop component installed on the network computer to which a non-network printer is attached, by starting a socket server to listen to a port and return non-network printer objects, the printer status information being for each non-network printer attached to the network computer;
   from the desktop component, sending, at a pre-determined time intervals, printer status information for each non-network printer to a server component;
   merging, by the server component, information obtained from the desktop component with previously stored printer information to provide printer status information for all network and non-network printers within an enterprise.

12. The method of claim 11 further comprising:
   providing, in the desktop component, an application layer interface for supporting requests for services and providing numerous structures for returning information about the network computer and the peripherals attached to the network computer;
   providing, in the desktop component, an intermediate layer for connecting the application layer interface with an upper layer; and
   providing, in the desktop component, the upper layer for reading files created by the application layer interface, for transforming information from the file into objects and for sending the objects to the server component.

13. The method of claim 12, further comprising using the structures to obtain information on the non-network printer status, condition and service.

14. The method of claim 12, further comprising, attaching an observer to each non-network printer and creating a status and page count file for each non-network printer, wherein the page count file is updated when a page is printed by the non-network printer.

15. The method of claim 12, further comprising running a service, in the upper layer, and registering the service in a registry with a specific name.

16. The method of claim 15, further comprising looking up, in the server component, the service in the register within a provided IP range for each IP address.

17. The method of claim 12, further comprising including in the server component, a data source which fetches data from an object and writes the data to a file.

18. The method of claim 17, wherein the data source is an XML data source which comprises an XML parser for fetching data from an object and writing the data to an XML file.

19. The method of claim 11, further comprising attaching an observer to each non-network printer to obtain toner status.

20. A computer program product embodied on a non-transitory computer readable medium, the computer program product being configured to execute a method for monitoring usage on non-network printers, comprising:
   attaching a job listener to a desktop component installed on a network computer to obtain printer status information for each non-network printer by listening to a job queue;
   obtaining printer status information for each non-network printer attached to the network computer;

at pre-determined time intervals, communicating the printer status information to a server component; and merging, by the server component, information obtained from the desktop component with previously stored printer information to provide printer status information for all network and non-network printers within an enterprise.

* * * * *